Oct. 24, 1967 G. R. BART 3,349,258

TEMPERATURE COMPENSATED QUARTZ CRYSTAL RESONATOR

Filed Aug. 14, 1964 2 Sheets-Sheet 1

Inventor:
George R. Bart
Gradolph, Love & Rogers
Attorneys

TEMPERATURE COMPENSATED QUARTZ CRYSTAL RESONATOR

Filed Aug. 14, 1964

Inventor
George R. Bart
Gradolph, Love & Rogers
Attorneys 3,349,258

TEMPERATURE COMPENSATED QUARTZ CRYSTAL RESONATOR

George R. Bart, Schiller Park, Ill., assignor to Victor Comptometer Corporation, Chicago, Ill., a corporation of Illinois Filed Aug. 14, 1964, Ser. No. 389,736
12 Claims. (Cl. 310—8.5)

This invention relates to quartz crystal resonators, and more particularly to a mounting system for such resonators that mechanically compensates for the natural change in the resonant frequency of such devices normally caused by changes in the ambient temperature.

It is an object of this invention to provide a novel quartz crystal resonator which, together with its mounting system, achieves a degree of temperature stability in excess of anything currently available, except in systems operating upon the basis of maintaining the crystal at substantially a constant temperature in spite of variations in the ambient temperature.

An additional object is to provide a novel quartz crystal resonator that resonates at a substantially constant frequency over a wide temperature range without the requirement for supplemental heating, thus reducing the power requirement of the system in which the resonator is used.

Another object is to provide a novel system which accomplishes temperature compensation of a crystal resonator in a different fashion from any heretofore known.

Still another object is to accomplish the above in a small, light weight device which can be provided at reasonable cost.

Other objects and advantages will become apparent from the following description of a preferred embodiment of my invention which is illustrated in the accompanying drawings.

In the drawings, in which particular characters of reference relate to particular parts throughout the several views, FIG. 1 is a front elevation of a resonator embodying the present invention with a portion of its case broken away so as to reveal the interior structure;

The manner of cutting, mounting and using quartz crystals is well known and needs no discussion here beyond perhaps noting that, when prepared for use, they constitute thin plates with terminals on each face, and that they vibrate in use at a resonant frequency which shifts considerably as a function of the temperature. In order to be specific the invention will be described as applied to an AT-cut plate operating on the third overtone of the thickness-shear mode at a nominal frequency of 30 mc. Different embodiments of the invention will include a resonator (FIGS. 1, 2, and 3) with an accuracy of about plus or minus one part per million over a temperature range of from about −40° C. to +80° C., a considerably smaller and simpler resonator (FIGS. 4, 5, and 6) which can have an accuracy of from 1 to 2 parts per million over a temperature range of from −20° C. to +80° C., depending upon the accuracy of the compensating structure and the care taken during manufacture, and a still simpler resonator (FIG. 8) which, while falling short of the compensating characteristics of the first two, may still have value where the requirements are not extreme.

Figures 4, 6, 8, 9:
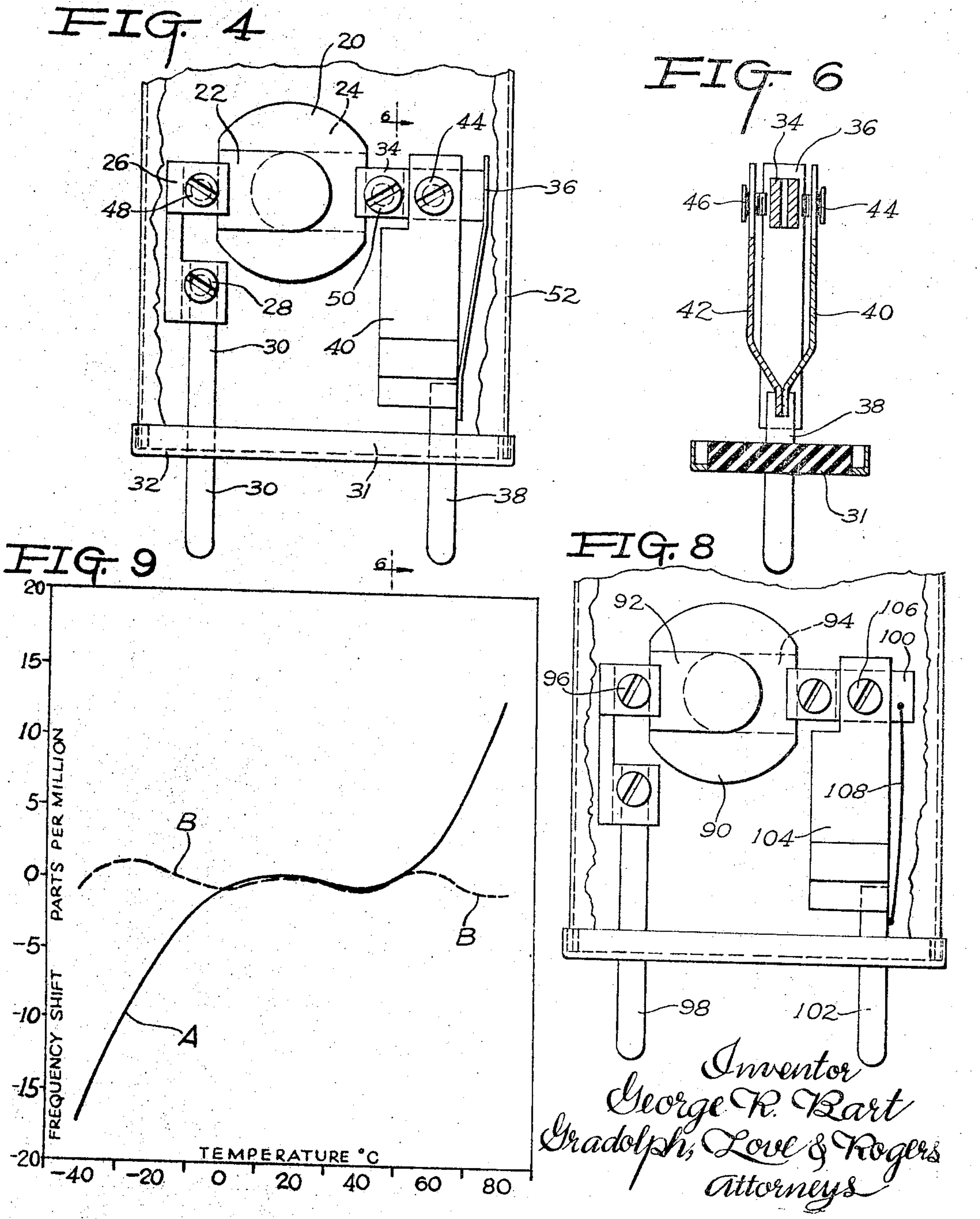
FIG. 4 is a view similar to FIG. 1, but showing an alternative form the device may take.
FIG. 6 is a vertical sectional view which may be considered as taken substantially along the line 6—6 of FIG. 4 in the direction indicated by the arrows.
FIG. 8 is a view similar to FIG. 4 showing another modification of my invention.
FIG. 9 is a graphic indication of a typical crystal's frequency variation over a typical temperature range shown both in the uncompensated state and as compensated according to the teachings of the present invention.

Quartz crystal resonators are used as frequency standards in electronic equipment, and in general, these devices are admirably suited for their purpose except that the resonant frequency of the crystal will vary considerably depending upon the temperature. The curve, indicated at A in FIG. 8, shows a typical frequency response plotted against temperature for an uncompensated quartz crystal resonator. Although this curve is typical, it should be considered as a member of a family of curves having a common point of inflection at about room temperature (approximately 30° C.), and that the specific curve can be considerably influenced as is well known by the manner of making the crystal. In general, this curve is substantially a cubic curve, characterized by steeply sloped ends connected by an S curve at the center, and the length of the central portion is fixed by the amount the frequency of the crystal can be permitted to drift upwardly and downwardly from the nominal value within this central range. Thus, as an example, if the final compensation of the crystal is to be within, say, plus or minus two parts per million, the crystal can be prepared so that the central S curve portion will not rise above or fall below the nominal frequency by more than two parts per million. Similarly, if the final compensation is to be within plus or minus one part per million, the crystal can be prepared so as to accomplish this, but under these conditions the central S portion of the curve will be shorter.

In the past, the standard approach for obtaining resonator frequency stability over a wide temperature range has been to prepare the crystal so that it resonates at the desired frequency at a point near the top of the desired temperature range, and then to provide an electric heating system—usually referred to as an oven—for keeping the crystal at this chosen high temperature. This approach, which is comparatively straightforward, has the disadvantage that it requires considerable electric power to operate the heater. Under some conditions where power is easily available this may be no particular disadvantage, but it is a serious disadvantage when frequency standards of this type are used in portable battery-powered equipment or equipment powered by solar cells and the like, as is readily apparent.

Although the resonator of the present invention may be used under other conditions, it is envisioned that its principal utility will be its use in equipment where the considerable power drain required by the usual oven would be a serious disadvantage.

In the past it has been understood that the application of pressure to the edge of a quartz crystal resonator has the effect of shifting its resonant frequency somewhat. The compensation of resonators by the application of a variable edge pressure has not proved to be feasible however, since the mounting requisites of such a system—i.e., cementing—result in a grossly distorted uncompensated frequency-temperature curve. So far as is known, attempts to obtain compensation in this fashion have been largely abandoned. It has been observed, and this observation is the premise of this invention, that the resonant frequency of a crystal can be shifted by a simple cantilever flexing, and that bending the crystals in one direction will shift the frequency up, and bending in the other direction will shift the frequency down. The degree of shifting under such simple bending is insufficient to obtain the necessary correction for, for instance, military specifications of from −40° to 80° C., but for a lesser range the compensation is sufficient.

Figure 7:
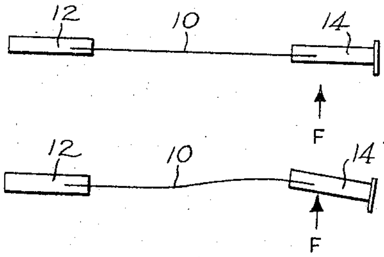
FIG. 7 is a diagrammatic representation indicating the manner in which the crystal is deformed for the purpose of obtaining compensation.

It has been further observed that the resonant frequency of a crystal can be much more sharply and greatly shifted by bending the crystal in an S configuration, and that bending the crystal in this manner in one direction shifts the frequency downwardly, whereas bending in the opposite direction shifts the frequency upwardly. This general principle of operation is illustrated diagrammatically in FIG. 7. The crystal plate is indicated by the numeral 10, and it is held at one edge by a fixed holder 12, whereas the opposite edge is secured to the device at 14 which is twisted to one side or the other by a thermostatic member (not shown) so that the system, when heated, assumes approximately the condition illustrated in the lower portion of FIG. 7.

Figure 2:
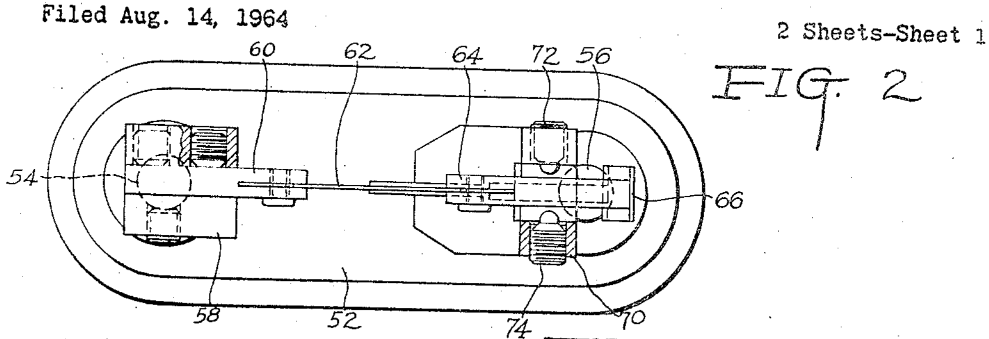
FIG. 2 is a top view of the device of FIG. 1 with the shell or can portion of the case removed.
Figure 1:
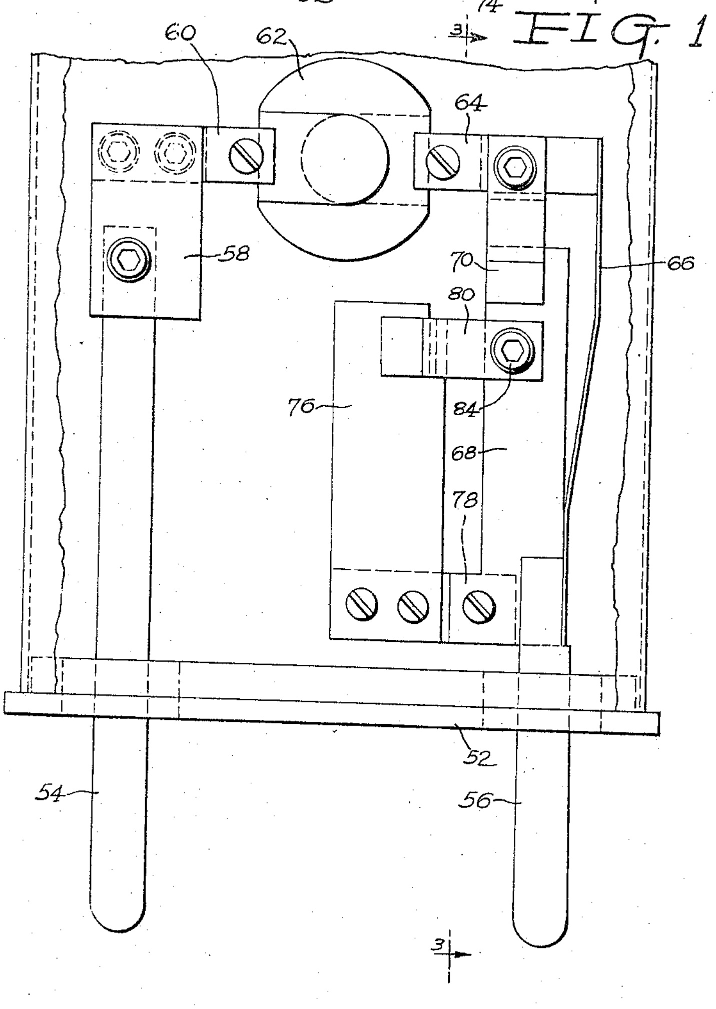
Figure 3:
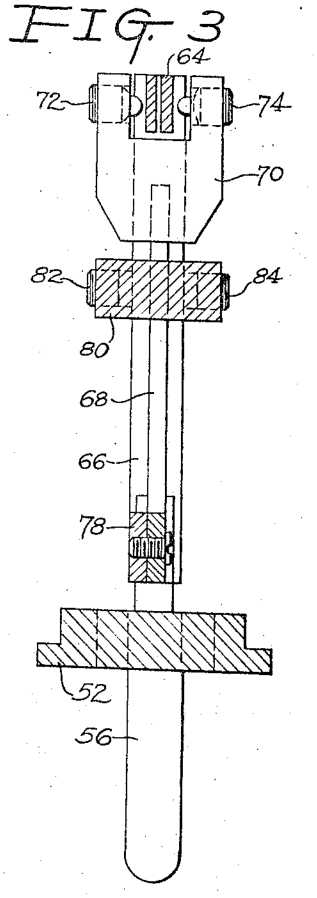
FIG. 3 is a vertical sectional view which may be considered as taken substantially along the line 3—3 of FIG. 1 in the direction indicated by the arrows.
Figure 5:
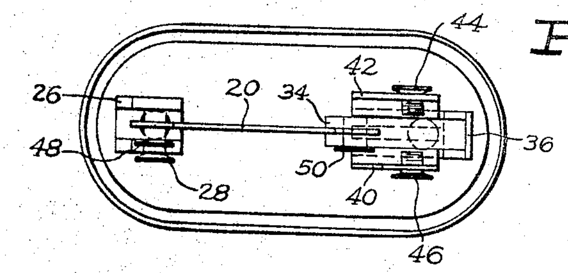
FIG. 5 is a top view of the device of FIG. 4, shown with the can removed.

The embodiment of the invention shown in FIGS. 1, 2 and 3 has been arranged to obtain a high order of frequency stability over a very wide temperature range. The embodiment of FIGS. 4, 5 and 6 is considerably simpler and smaller and is specifically intended to obtain less accurate compensation over a somewhat narrower temperature range. Its use is of course indicated under conditions where an extremely high order of compensation is less important than the cost, size, and weight of the article.

The embodiment of FIG. 8 is still simpler, and illustrates a device where simple cantilever bending of the crystal is employed.

In the device of FIGS. 4, 5 and 6, the crystal resonator plate is indicated at 20, and this plate is shown as having terminal strips 22 and 24 on its opposite faces. At its left hand edge the plate is held in a closely fitting slot formed in a bracket 26, the lower end of which is secured by a set screw 28 to a contact pin 30 which passes through an insulator 31 in the base 32. This support system for the left hand edge of the crystal may be considered as being essentially rigid in nature.

At its opposite edge the resonant plate is similarly held in a slotted bracket 34 which is welded or otherwise suitably secured to a leaf spring 36, the lower end of which is fastened to the other terminal post 38 which passes through the insulator 31 in the base. The spring 36, as may be seen in FIGS. 5 and 6, is thin, but fairly wide, so that it may be considered as being essentially rigid against transverse bending. On the other hand however, it is comparatively flexible torsionally. Essentially, therefore, the crystal plate is so gripped that it will not move as a unit from side to side relative to the base 32, but the mounting 34 on the right hand side, when pushed laterally, will twist the crystal into an S curve by rotation of the mounting bracket 34 about its point of attachment to the spring 36. In other words, the attachment of the spring 36 to the bracket 34 acts as a hinged edge for the outer end of the bracket.

The crystal is mounted on its Z′ axis so that flexure takes place along the X′ axis.

A pair of bimetal blades 40 and 42 are attached at their lower ends to the pin 38, and are bent to extend upwardly so that they form a U-shaped structure which straddles the mounting bracket 34. Near their upper ends and in alignment with the bracket 34 the blades 40 and 42 carry adjusting screws 44 and 46 respectively, so arranged that the inner ends of these screws will impinge against the bracket 34 upon a certain amount of deflection of the blades 40 and 42 in a direction toward the mounting 34. Although it is not shown in FIGS. 5 and 6, it is preferable to equip the ends of the screws 44 and 46 with glass beads or the like so that a better bearing contact is provided (see FIG. 2). Much the same thing can be accomplished, of course, by using screws 44 and 46 which have been rounded and hardened by heat treatment.

The amount of deflection with temperature change of the bimetal elements is so chosen, and the adjustment of the screws 44 and 46 is such that neither of the bimetal elements 40 or 42 bends sufficiently to bring the ends of the screws 44 and 46 against the mounting bracket 34 within the temperature range at which the crystal is operating throughout the central portion of the curve in FIG. 9 where no compensation is required. At a somewhat elevated temperature, however, where curve A of FIG. 9 diverges from curve B at the high temperature side of the figure, bimetal blade 40 will have bent sufficiently toward the mounting bracket 34 so as to bring the end of the screw 44 against the edge of the bracket. As the temperature rises above this level, the bimetal blade 40 will bend more and more so as to deflect the bracket 34 more and more toward the left, as seen in FIG. 6 for instance. This produces a condition such as that shown in the lower portion of FIG. 7 and has a tendency to shift the resonant frequency of the crystal downwardly. By proper choice of characteristics of the bimetal member 40, the amount of downward shift in frequency due to twisting of the crystal can be made to counteract to a considerable extent the natural tendency of the frequency of the crystal to drift upwardly, thus producing a resultant effect as indicated by the portion of the curve B at the right hand side of FIG. 9.

During the portion of the cycle described above relating to high temperature operation of the crystal, the bimetal blade 42 simply bends away from the mounting bracket 34 so as not to inhibit motion of the bracket.

When the device is cooled, the blade 40 recedes to its original condition and, with additional cooling, moves away from the bracket 34. With further cooling, the screw 46 is brought against the bracket on the opposite side by the bimetal blade 42, and subsequently the blade 42 pushes the mounting bracket in the opposite direction and tends to shift the resonant frequency of the crystal upwardly, thereby compensating for the normal tendency of the crystal frequency to drift downwardly. The result of these two tendencies is to produce a resonant frequency as illustrated by the curve B at the left hand portion of the drawing.

The compensating effect is not perfect because flexing the crystal produces a straight line change in the frequency with a change in position, whereas the change in the resonant frequency of the crystal due to a change in temperature is not straight line, but a cubic curve, as is indicated by curve A in FIG. 9. Within certain temperature ranges and allowable error, however, compensation of the order produced is adequate.

One of the advantages of the invention is that, as opposed to other compensating crystal distortions, the flexural distortion permits a clamping of the crystal for support, rather than a cementing of the crystal to its holders. Cementing creates gross distortions in the uncompensated frequency-temperature curve. A good scheme that works well in practice is to cut the slots in the brackets so that they are just slightly wider than the crystal thickness, and then use clamping screws of the type indicated at 48 and 50 to squeeze the edges of the slots slightly closer together so that the crystal is just clamped but not so tightly as to cause appreciable distortion of the plate.

As is customary with devices of this character, after the crystal and its holder have been assembled and adjusted, a formed metal cover 52 is slipped over the operating portion of the mechanism and soldered or otherwise sealed to the base 32, electrical contact being made to the crystal by way of the pins 30 and 38, these pins of course being connected to the crystal terminals by way of the mounting structure and support brackets 26 and 34.

When a higher order of compensation is required, this can be accomplished by using the scheme shown in FIGS.

1, 2 and 3. Here the base 52 is equipped with pins 54 and 56, one of which (54) carries a bracket 58 at its upper end which is secured by means of a clamp 60 to one edge of the crystal 62 in substantially the same manner as is indicated in FIG. 4. The opposite edge of the crystal is similarly held by a clamp 64 connected to a spring 66 which extends downwardly so as to be secured to the other pin 56, all in a manner substantially identical to the arrangement shown in FIG. 4. The pin 56 also carries an upstanding bimetal blade 68 the upper end of which is provided with a yoke 70 which straddles the mounting clamp 64, this yoke carrying adjustment screws 72 and 74 which serve the same purpose as the screws 44 and 46 in the other embodiment. Thus, as the bimetal blade 68 is deflected in one direction or the other by changes in temperature, one or the other of the screws 72 or 74 will bear against the clamp 64 and twist the crystal into an S configuration so as to produce a first order of compensation in the same manner as is accomplished by the device of FIGS. 4 to 6.

The post 56 also carries a second bimetal blade 76 secured thereto by a bracket 78, which extends upwardly and is equipped near its upper end with a yoke 80 extending laterally so as to straddle the first bimetal blade 68 at a point just below the yoke 70. This second yoke 80 is also equipped with adjusting screws 82 and 84 which bear against opposite faces of the bimetal blade 68 upon deflection of the bimetal member 76 in one or the other direction.

The bimetal member 76 is made so that it deflects with temperature change at a higher rate than the bimetal member 68, but the clearance between the ends of the screws 82 and 84 and the bimetal blade 68 is great enough so that upon heating or cooling of the system away from the central temperature region, initial movement of the bimetal blade 76 does not apply any pressure to the blade 68. Thus, as the system cools, for instance, a certain temperature will be reached at which the bimetal blade 68 will begin to twist the crystal so as to apply a first order of compensation. At a somewhat lower temperature, after the bimetal blade 68 has bent the crystal a predetermined amount, the secondary bimetal blade 76 will have deflected enough to catch up to the first bimetal blade, and thereafter the bending effect upon the crystal with change in temperature is at a somewhat higher rate.

It has been found that by a proper choice in the characteristics of the various elements making up the device of FIGS. 1 to 3, it is possible to achieve a compensation such that the frequency drift of the resonator is no more than one part per million, plus or minus, over a temperature range of from −40° C. to +80° C.

Theoretically, of course, it would be conceivable to obtain still higher orders of accuracy by using a third order of compensation by using a third bimetal element which comes into action only over extremely wide temperature swings, but for practical purposes it appears that the use of two bimetal elements as shown in FIGS. 1 to 3 will give all the compensation normally required. In fact, in most instances, sufficient corrective action will be obtained by having the secondary blade 76 apply a pressure in only one direction. For instance, if the temperature range is from +80° C. to −40° C., one stage will normally give sufficient correction in the range from normal room temperature up to +80° C., but two stages may be required to cover the range from room temperature down to −40° C.

The device illustrated in FIG. 8 is very similar to that shown in FIG. 4. Again, a crystal 90 is shown having terminal strips 92 and 94 on opposite faces. The left edge of the crystal is clamped in rigid bracket 93, which in turn is fixed to contact pin 98.

A bracket 100 is clamped to the right edge of the crystal 94 to extend beyond the crystal. The second contact pin 102 mounts a pair of bimetallic blades 104 with adjusting screws 106 in their upper ends exactly like the blades 40 and 42 of FIG. 6. The screws 106 contain the bracket 100 between them, again as in FIG. 6.

The distinction in this modification is that spring 36 of FIG. 6 is lacking, and substituted therefor is a conductor or wire 108 interconnecting the pin 102 and the bracket 100. The bracket thus protrudes free between the bimetal blades, and the crystal is entirely unsupported at the right-hand end. Pressure applied on the bracket by either of the blades will therefore impart a simple curvature to the crystal from its bracket 96 supported edge by moving the free end away from its normal position. This simple curvature is, for purposes of this application, termed a cantilever bend or curve. The wire 108 takes the place of the spring 36 in its capacity as a conductor.

Although the invention has been described as embodied in three similar structures, it will be appreciated that variations may be made in the arrangement without departing from the scope or spirit of the invention, and therefore the invention is to be regarded as being limited only as set forth in the following claims.

I claim:

1. A quartz crystal resonator comprising a quartz crystal plate, a pair of mounting means secured to the edge of said plate at opposite sides thereof and temperature sensitive means adapted to move one of said mounting means increasingly with an increasing deviation of temperature from a norm to impose an S curve on said plate.

2. The combination as set forth in claim 1 wherein said mounting means are clamps.

3. The combination as set forth in claim 1 wherein said temperature sensitive means is ineffective to move said mounting means within a range adjacent to and including said norm.

4. The combination as set forth in claim 1 including a second temperature sensitive means adapted to accelerate the rate of curvature increase upon deviation from said norm beyond a predetermined deviation.

5. A quartz crystal resonator comprising a quartz crystal plate, a pair of mounting means secured to the edge of said plate at opposite sides thereof, means securing one of said mounting means in a fixed position, and temperature sensitive means adapted to move the other of said mounting means increasingly with an increasing deviation of temperature from a norm to impose an S curve on said plate.

6. A quartz crystal resonator comprising a quartz crystal plate, a pair of mounting means secured to the edge of said plate at opposite sides thereof, means securing one of said mounting means in a fixed position, and temperature sensitive means secured to the other of said mounting means and adapted to bend the plate in an S curve in one direction with a rise in temperature and to bend said plate in an S curve in the opposite direction with a fall in temperature.

7. A quartz crystal resonator comprising a quartz crystal plate, a fixed clamp engaging one edge of said plate, a pivotally mounted clamp engaging the opposite edge of said plate and movable to impose an S curve on said plate, and temperature sensitive means mounted to move said pivotally mounted clamp increasingly with an increasing deviation in temperature from a norm.

8. The combination set forth in claim 7 wherein said temperature sensitive means is adapted to bear against the side of said movable clamp and includes a bimetallic element.

9. The combination as set forth in claim 8 wherein said means is spaced from said clamp at said temperature norm.

10. A quartz crystal resonator comprising a quartz crystal plate, a fixed clamp engaging one edge of said plate, a pivotally mounted clamp engaging the opposite edge of said plate and movable to impose an S curve on said plate, and temperature sensitive means including a bimetallic element adapted to pivot said clamp in both directions from its normal, crystal-determined position, in one direction with a rise in temperature and in the opposite direction with a fall in temperature.

11. The combination as set forth in claim 10 wherein said means includes provision for free movement thereof relative to said clamp in the vicinity of a temperature norm.

12. A quartz crystal resonator comprising a quartz crystal plate, a fixed clamp engaging one edge of said plate, a pivotally mounted clamp engaging the opposite edge of said plate and movable in opposite directions to impose an S curve in either direction on said plate, and a first temperature-responsive member including a bimetallic element mounted to engage said pivotally mounted clamp to move said clamp in one direction upon an increase in temperature and in the other direction upon a decrease in temperature, and a second temperature-responsive member including a bimetallic element mounted to increase the rate of the bending of said crystal upon a greater temperature deviation.

References Cited

UNITED STATES PATENTS

| | | | |
|---|---|---|---|
| 2,636,135 | 4/1953 | Peek | 310—8.2 |
| 3,020,423 | 2/1962 | Gerber | 310—8.9 |
| 3,102,963 | 9/1963 | Gerber | 310—8.9 |
| 3,197,753 | 7/1965 | Voutsas | 310—8.2 |
| 3,200,271 | 8/1965 | Haines | 310—8.5 |

MILTON O. HIRSHFIELD, *Primary Examiner.*

J. D. MILLER, *Assistant Examiner.*